Figure 1:
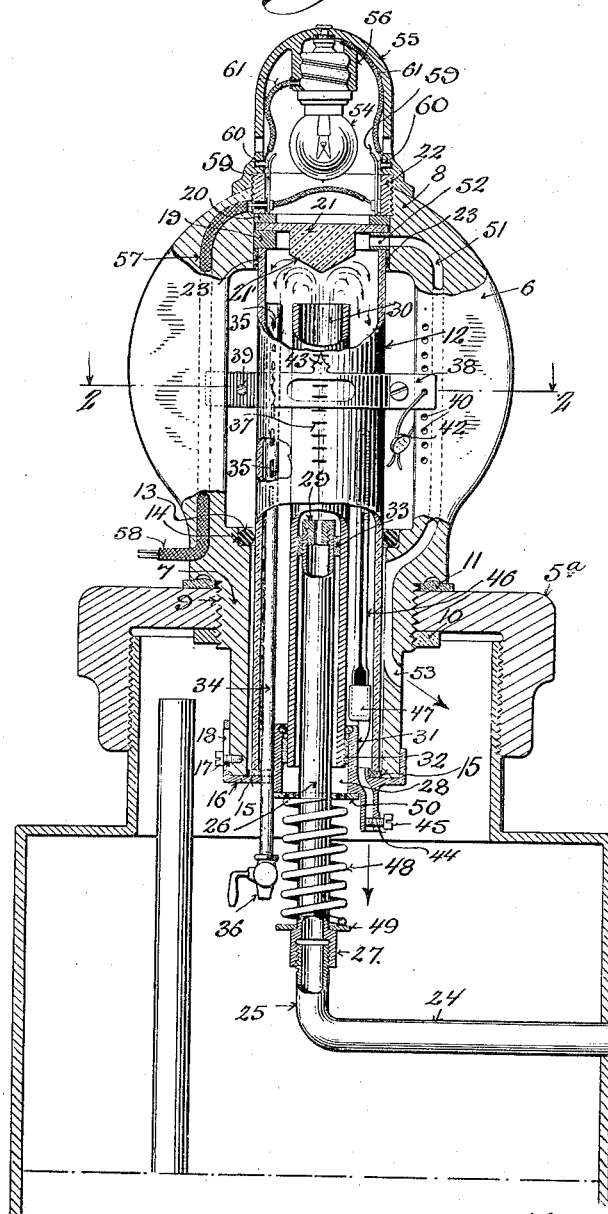

C. S. DRAKE.
CIRCULATION INDICATING DEVICE FOR LIQUID COOLING SYSTEMS OF ENGINES.
APPLICATION FILED SEPT. 27, 1915.

1,202,977.

Patented Oct. 31, 1916.
2 SHEETS—SHEET 1.

C. S. DRAKE.
CIRCULATION INDICATING DEVICE FOR LIQUID COOLING SYSTEMS OF ENGINES.
APPLICATION FILED SEPT. 27, 1915.
1,202,977.
Patented Oct. 31, 1916.
2 SHEETS—SHEET 2.
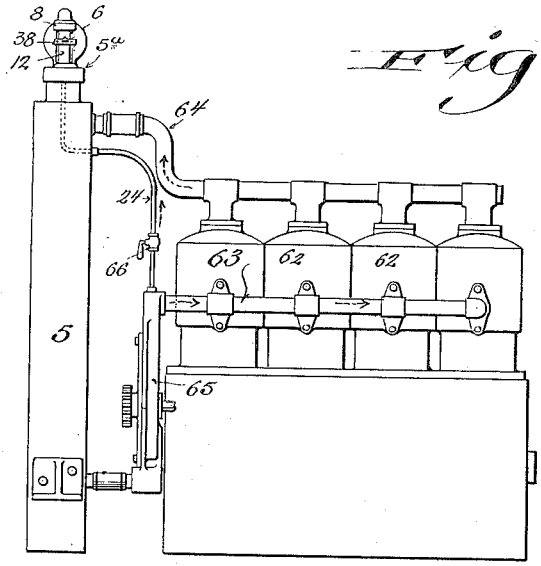
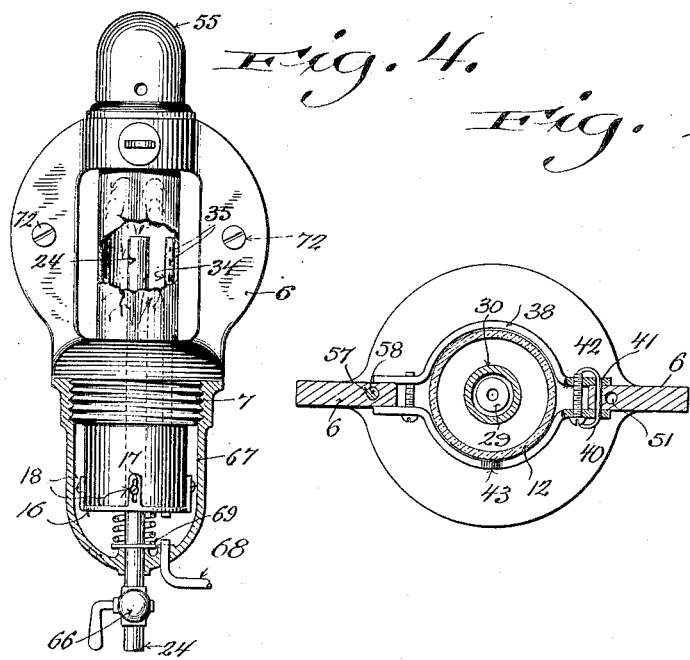

UNITED STATES PATENT OFFICE.

CLARKE S. DRAKE, OF MILWAUKEE, WISCONSIN.

CIRCULATION-INDICATING DEVICE FOR LIQUID-COOLING SYSTEMS OF ENGINES.

1,202,977.

Specification of Letters Patent.  Patented Oct. 31, 1916.

Application filed September 27, 1915. Serial No. 52,973.

*To all whom it may concern:*

Be it known that I, CLARKE S. DRAKE, a citizen of the United States, and resident of Milwaukee, in the county of Milwaukee and State of Wisconsin, have invented certain new and useful Improvements in Circulation-Indicating Devices for Liquid-Cooling Systems of Engines; and I do hereby declare that the following is a full, clear, and exact description thereof.

The present invention is directed to the provision of a device which may be associated with the liquid cooling system of an engine, and particularly of an automobile engine and has for its primary object to indicate the degree of flow of liquid through the cooling system and to provide various other indications with respect to the liquid in the cooling system.

A more specific object of the invention resides in the provision of such a device which may be adjusted with respect to an engine so as to indicate the speed at which the engine is operating, and which therefore with respect to the engines of automobiles or of other self propelled vehicles, may be utilized to indicate the speed at which the vehicle travels.

Another object is to provide a device wherein a portion of the fluid of the cooling system may be readily trapped so that such fluid may be exposed for observance to determine the liability of freezing of the fluid in the system.

A further object in this connection is to provide an indicating device such as heretofore described, which is provided with safety outlet means for permitting escape of fluid should said fluid start to freeze whereby breakage of the device may be prevented.

Another object is to combine the above mentioned features in a compact and efficient device which may be readily secured on an automobile and connected with the cooling system of the engine thereof.

With the above and other objects and advantages in view, the invention resides more particularly in the novel combination, arrangement and formation of parts more particularly hereinafter described and particularly pointed out in the appended claims.

Reference is had to the accompanying drawings wherein similar characters of reference designate corresponding parts throughout the several views and in which:

Figure 1 is an elevational view of the improved indicating device, showing portions thereof broken away to more clearly disclose its construction, the device in this instance being shown as connected with and mounted on the filling cap of an automobile radiator; Fig. 2 is a transverse sectional view taken on the line 2—2 of Fig. 1; Fig. 3 is a side elevation of an automobile engine and the radiator of its cooling system, and showing the improved device connected therewith; Fig. 4 is a modified form of the device particularly adapted for attachment to the instrument board of an automobile.

Referring now more particularly to the first three figures of the drawings, one embodiment of my invention is shown attached to the cap 5ª of a radiator tank 5. This form of the device comprises a body frame including spaced, axially alined sleeve portions 7 and 8 respectively connected by a pair of arms 6. The sleeve 7 is reduced and threadedly passed through an opening 9 in the cap and a nut 10 is threaded on the sleeve within the cap to hold it in place, a suitable gasket 11 being disposed on the shoulder formed by the reduction of the sleeve to hold the parts firmly. Disposed in the sleeves and extending therebetween to form a casing for the fountain hereinafter to be described and to form a container for a column of water is a glass tube 12 which is of slightly less diameter than the bores of the sleeve and which is held against movement laterally by a resilient gasket ring 13 seated on a shoulder 14 formed by counterboring the inner end of the sleeve 7. The lower end of the tube 12 is supported on a washer 15 which is seated on a cup-shaped closure plate 16 and resiliently pressed thereby against the bottom of the tube 12 to provide a water-tight joint, this plate being slidably held to the sleeve by screws 17 passed through slots 18 in its wall portion. On the upper end of the tube within the sleeve 8 rests a gasket 19 and between this gasket and a second gasket 20 in the sleeve is disposed a glass plate 21. A follower sleeve 22 is threaded in the upper end of the sleeve 8 and engages the gasket 20 to firmly hold the parts in place, a resilient washer 23 being preferably disposed about the tube within the sleeve 8 to hold the tube centered and allow for expansion and contraction of parts.

Extending transversely into the top of the radiator from a desired point in the circulating system is a pipe 24 which has its end 25 upturned in axial alinement with the tube 12 and a pipe section 26 which forms an extension of the pipe 24 is connected to the pipe portion 25 by a suitable union 27 and extends through an opening 28 in the closure-plate 16 and upwardly into the tube. A reducing nipple or nozzle 29 is threaded in the upper end of this pipe 26 to form a fountain.

As will be later described, a column of water may be sustained in the tube to indicate the speed of operation of the engine and consequently the speed of travel of the vehicle. To permit a free fountain action of the stream from the nozzle 29 through this column of water, a shield pipe 30 is disposed about the inlet pipe 26 within the tube and is supported by gaskets 32 carried by an upstanding annular flange 31 surrounding the opening 28. This pipe is of greater bore than the outside diameter of the pipe 26 and to prevent flow of fluid downwardly between the two pipes, and to hold the pipe 26 with respect to this shield pipe, a sliding gasket 33 is disposed about the upper end of the said pipe 26.

Extending through the plate 16 and upwardly in the container tube is a pipe 34 which is provided with a series of openings 35 extending from a point above the top of the sleeve 7 to the top of the pipe, which terminates adjacent the top of the pipe 30, these openings being designed to provide upwardly decreasing ratios of combined capacity to equal pipe lengths, being preferably gradually successively reduced in size upwardly as shown, to accomplish this, although the same result may be accomplished by successively upwardly increasing the distance between openings of equal size or the pipe may be slotted throughout. The lower end of the pipe is adapted to be closed by a suitable valve 36, but is normally open to permit free flow of fluid through the pipe, it being understood that the pipe has a capacity at least equal to the sum of the capacities of the openings 35, and equal to the capacity of nozzle 29.

Thus in operation the cooling system fluid flows through the pipe 26 and out through the nozzle 29 to the top of the tube. The plate 21 which closes the top of the tube is provided with a depending conical enlargement 21′ which deflects the stream of fluid to the sides of the tube and which in addition serves as a bull's-eye lens for an electric light disposed thereover. The water then flows downwardly in the tube and flows outwardly through one or more of the openings 35 of the pipe 34 into said pipe and back into the radiator.

It is a well known fact that, as the speed of a fluid cooled engine is accelerated, the flow of fluid is also accelerated and consequently the flow of fluid in the tube 12 would be accelerated. The capacity of the lowest opening 35 is sufficient to accommodate the flow of fluid into the container at a relatively low speed. As, however, the speed of the engine and consequently the flow is accelerated this opening is not sufficiently large to accommodate the flow and the level of fluid rises in the tube 12 until the sum of the capacities of the openings 35 adjacent and below its level is sufficient to accommodate the inflow. Thus at a certain speed of engine operation, a fluid column of a certain height will be maintained in the tube and this column will vary in height in accordance with variation of the speed of operation of the engine. As normally the speed of operation of the engine determines the speed of travel of the vehicle the height of the fluid column may readily indicate the speed of travel of the vehicle, and the speed of travel in terms of miles per hour of the vehicle may be indicated with respect to the fluid column by providing a series of predetermined graduations 37 at the side of the tube.

For indicating a certain speed, as for instance the permitted limit of automobile speed in a community, an indicator member is provided, comprising a pair of oppositely bowed plates 38 having their end portions directed laterally outward in alinement and lying over adjacent sides of the arms 6. Adjacent end portions are connected by screws 39 and thus the structure is held to and may be slid vertically on the tube 12. For locking this member at any desired elevation, one of the arms 6 is provided with a vertical series of openings 40 which are adapted to selectively aline with openings 41 provided in an adjacent pair of plate end portions, whereby a seal wire 42 may be passed through the alined openings. One of the plates 38 carries a pointer member 43 for indicating a certain desired level of fluid.

A nipple 44 depends from the plate 16 to provide a drain, and this nipple is adapted to be closed by a screw 45 threaded in its side wall.

When the engine is not running, the level of the fluid column is at the bottom of the lowest opening 35 which as stated is spaced above the sleeve 7 so that the column is exposed to sight whereby it may be observed to determine its tendency to freeze. As such fluid trapped in the tube would be more exposed than fluid in a cooling system proper, it would tend to freeze sooner than the fluid in the cooling system. A thermometer 46 is disposed in the tube, and is carried in a vertical sleeve 47 carried by the shield pipe supporting flange 32. Should fluid start to freeze in the tube, with a consequent expansion, or should pressure in the tube accumulate due to steam being formed in the system or to excessive pump action in the system or to clogging, possible damage to the device is prevented by the resilient securement of the bottom closure plate 16, this plate being held in place by a coiled spring 48 surrounding the lower portion of the pipe 26 and bearing against a plate 49 resting on the shoulder formed by the union 27 and against a perforated plate 50 resting against the said closure plate adjacent its opening.

To provide a vent means for the tube when the valve 36 of the outlet pipe is closed to relieve air pressure in the tube, one of the arms 6 is provided with a longitudinal passage 51, which is continuous at its upper end through the sleeve 8 and communicates with an opening 52 formed in the gasket 19 and which at its lower end continues through the sleeve 7 and communicates at 53 with the interior of the radiator.

An electric lamp 54 is provided for illuminating the tube and this lamp is carried in a casing 55 which has a closed end formed with a socket 56 for receiving the lamp and which has an open end adapted to be threaded on the follower sleeve 22, which as is seen, projects above the sleeve 8. For supplying current to this lamp, that arm 6 which is not provided with the overflow passage 51 is provided with a passage 57 through which is passed insulated electric wires 58, these wires extending through the follower sleeve 22 and being attached to upstanding insulated spring contact fingers 59 which extend above the sleeve and are adapted to engage contact members 60 in the casing from whence wires 61 extend to the socket 56. A structure is thus provided whereby the lamp may be readily removed or replaced as desired, and whereby it is fully protected against possible breakage and yet supported in such manner that its unobstructed rays pass down into the tube 12 through the bull's-eye enlargement 21'.

In Fig. 3 the device is shown assembled with relation to an engine, which is designated conventionally at 62. 63 and 64 designate respectively the inlet and outlet manifolds of the cooling system and 65 designates the usual pump connected with the inlet manifold. The pipe 24 of the device is preferably connected to the inlet manifold between the pump and the engine, although it may be attached at any desired point, and may, if desired, carry the entire flow of the cooling system, it being seen that in the present instance it carries only a portion of the flow. In this case the pipe 24 would be identical with the outlet manifold 64. This pipe 24 is provided adjacent its attachment to the manifold with a valve 66 whereby the operation of the indicating device may be cut off if desired.

Fig. 4 shows a modified form of the device which is particularly adapted for attachment to the instrument board of an automobile. In this structure the body frame and tube 12 are identical with the previous structure, and are similarly connected, but a cylindrical trap member 67 is provided to receive the sleeve 7 and the inlet pipe 24 extends through the closed bottom of the trap member and up through the sleeve in the usual manner, the closure plate being in this instance supported by the spring 69 bearing thereagainst and supported by the bottom of the member 67. The pipe 34 and the opening 51 of the arm 6 discharge into the trap member 67 and a pipe 68 extends from the trap member to a radiator or other desired portion of the cooling system. This form of the device is secured to the instrument board by screws 72 passed through the arms 6 and the pipes 24 and 68 are connected to the cooling system in any manner whereby a flow of fluid through the indicating device is assured.

In this connection it is desired to state that although the invention has been described as for use in connection with a cooling system including a pump driven by the engine, that the device may as readily be used with any other type of fluid cooling system, such as the thermosiphon type. Also, although one embodiment of the invention has been shown as particularly adapted for use in connection with automobile engines, that other embodiments involving the novel principles brought out in the claims may be had for other types of engines including fluid cooled systems and other embodiments and modifications to meet different conditions of use may be employed within the scope of the claims without departing in any manner from the spirit of the invention. For instance, it is noted that the tube 12 is really a housing or casing or container for the pipe 24 which is the essential pipe of the device, and that such housing or casing or container may be of any form or attached in any desired manner and may be formed of any material and in any manner which provides a view of fluid discharged from the pipe 24.

During the summer months or during any other climatic conditions where there is no liability of the freezing of the cooling system fluid the provision of a column in the tube to determine the liability of freezing would be done away with by opening the drain 44 sufficiently to form a bleed opening to drain the tube when the engine is not running, the outflow of fluid through this bleed opening, however, normally being so slight as to not interfere substantially with the speedometer operation of the device when the engine is running. This speedometer feature may, if desired, be done away with, and the fluid may simply flow out of the tube through the open drain 44. In this case there would be no column of water retained at all normally in the tube. It is possible to provide for the retention of a column of water in the tube to indicate liability of freezing without including the speedometer feature of the device by removing the gasket 33 and adjusting and shortening the shield pipe 30 so that its top will be disposed below the nozzle 29.

When a device is arranged in this manner, the fluid flowing outwardly of the pipe 24 would provide a column of water level with the top of the shield pipe 30 and the fluid would overflow between the pipe 30 and the extension 26 of the pipe 24 and outwardly through the perforations of the plate 50, provided drain 44 is restricted with relation to the nozzle.

Thus it will be seen that the present invention has many phases, and may be interpreted in many embodiments including various of the features enumerated, or all of the features enumerated, but that all of the features enumerated co-act as demonstrated in the embodiment particularly illustrated in Fig. 1 to provide a unitary device.

While I have illustrated only one main embodiment of my invention, it will be understood that in the manufacture of my invention I am to be limited only by the scope of the appended claims.

I claim:—

1. Means including a container adapted to be connected with the fluid cooling system of an engine for indicating flow of fluid and means for trapping fluid in said container.

2. Means including a container adapted to be connected with the fluid cooling system of an engine for indicating flow of fluid, means for trapping fluid therein and means associated with the container for releasing trapped fluid upon tendency thereof to freeze.

3. A fluid indicating device comprising a container having an outlet adjacent its bottom, an inlet pipe extending upward in the container a nozzle member at the discharge end of the inlet pipe, a shield disposed about and extending above the nozzle member, and means for sustaining a column of water in the container variable in height with respect to variation of the flow of fluid through the inlet pipe.

4. A flow indicating device comprising a container having an outlet adjacent its bottom, an inlet pipe extending upward in the container a nozzle member at the discharge end of the inlet pipe and a shield pipe disposed about the nozzle member, said shield pipe having communication with the exterior of the casing and adapted to permit fluid to flow between it and the inlet pipe to provide an overflow means.

5. A fluid indicating device including a container, an inlet pipe extending upwardly in the container, outlet means for the container, means for closing said means, and a safety valve in the lower portion of the container.

6. A fluid indicating device including a container, an inlet pipe extending upwardly in the container, outlet means for the container, means for closing said means, and a spring pressed closure for the bottom of the container.

7. A fluid indicating device including a container, a closure member for the bottom of the container, an inlet pipe extending upward into the container and passed through said closure member and a spring carried by said pipe for urging said member to closing position.

8. A fluid indicating device including a container an annular member adapted to seat the bottom of the container, a shield pipe connected with the inner peripheral edge of the member, an inlet pipe extending into the container through the shield pipe and terminating short of the upper end thereof, and an outlet for the container having a variable capacity.

9. A fluid indicating device including a container, an annular closure member adapted to seat the bottom of the container, an upstanding annular flange at the inner periphery of the closure member, a shield pipe in the container adjustably secured to said flange, an inlet pipe extending into the container through the shield pipe, a perforated plate on the pipe bearing against the closure member, and a spring carried by the pipe and bearing against the plate to hold the closure member in closing position.

10. An indicating device including a casing, an inlet pipe extending upwardly in the casing, a transparent member at the top of the casing, having an inwardly directed conical enlargement and means for supporting a lamp above said member.

11. An indicating device comprising a casing including a pair of spaced sleeves, arms connecting the sleeves, a tubular member supported in the sleeves and closed at its ends, an outlet means at one end, an inlet means, and one arm and adjacent sleeve portions being provided with an overflow passage having its ends disposed inwardly of one sleeve to communicate with the tubular member and outwardly of the other sleeve, and an overflow receiving portion connected with said other sleeve.

12. An indicating device comprising a pair of spaced upper and lower sleeves, arms connecting said sleeves, means for supporting the sleeves and arms, an inlet pipe extending through one of the sleeves, a tubular member having its ends disposed in the sleeves, a plate at the outer end of the lower sleeve for seating the member, a spring surrounding the said pipe to hold the plate and a follower member engaged in the other sleeve to receive the adjacent end of the tubular member.

13. A device for indicating flow of fluid comprising a transparent container, having an inlet and an outlet adapted to be connected with a fluid circulating system, said inlet being disposed above the outlet and adapted to discharge water in a fountain and means for closing the outlet.

14. In a fluid indicating device, a casing, a sleeve surrounding one end portion thereof, a follower member threaded in the sleeve to hold the casing, and extending outwardly of the sleeve, and a lamp casing threaded on the follower member.

15. In a fluid indicating device, a casing, a sleeve surrounding one end portion thereof, a follower sleeve threaded in the first sleeve to hold the casing and extended above said first sleeve, a pair of spring contact fingers carried in the follower sleeve and extended thereabove, a lamp casing threaded on the follower sleeve and contact members carried in said casing to engage the fingers.

16. An indicating device comprising a casing including a pair of spaced sleeves, arms connecting the sleeves, a tubular member supported in the sleeves and closed at its ends, an outlet means at one end, an inlet means, and one arm and adjacent sleeve portions being provided with an overflow passage having its ends disposed inwardly of one sleeve to communicate with the tubular member and outwardly of the other sleeve.

17. The combination with a radiator cap of a transparent casing carried thereby and extending thereabove, an outlet in the casing adapted to discharge into a radiator and a fountain pipe extended into the casing and adapted for connection with a portion of a liquid cooling system.

18. The combination with a radiator body having a filling opening and a cap for closing the opening of a transparent casing carried by the cap and open at its bottom to discharge into the radiator body and a fountain pipe carried by the body and adapted to project into the casing.

In testimony that I claim the foregoing I have hereunto set my hand, at Milwaukee, in the county of Milwaukee and State of Wisconsin, in the presence of two witnesses.

CLARKE S. DRAKE.

Witnesses:
  GEO. W. YOUNG,
  M. E. DOWNEY.